(12) United States Patent
Goldman et al.

(10) Patent No.: US 12,533,970 B1
(45) Date of Patent: Jan. 27, 2026

(54) BIDIRECTIONAL SLIP-CONTROLLED ELECTRICAL DRIVE AND BRAKING SYSTEM WITH INTEGRATED DIFFERENTIAL FUNCTIONALITY

(71) Applicants: Alon Goldman, Netanya (IL); Michael Nenner Weil, Tel-Aviv (IL)

(72) Inventors: Alon Goldman, Netanya (IL); Michael Nenner Weil, Tel-Aviv (IL)

( * ) Notice: Subject to any disclaimer, the term of this patent is extended or adjusted under 35 U.S.C. 154(b) by 0 days.

(21) Appl. No.: 19/211,186

(22) Filed: May 18, 2025

(51) Int. Cl.
*B60K 1/04* (2019.01)
*B60L 15/20* (2006.01)

(52) U.S. Cl.
CPC ....... *B60L 15/2054* (2013.01); *B60L 15/2036* (2013.01); *B60L 15/2045* (2013.01); *B60L 2240/12* (2013.01); *B60L 2240/421* (2013.01)

(58) Field of Classification Search
CPC ............ B60L 15/2054; B60L 15/2045; B60L 15/2036; B60L 2240/12; B60L 2240/421
See application file for complete search history.

(56) References Cited

U.S. PATENT DOCUMENTS

2017/0174198 A1* 6/2017 Eckert .................... B60T 13/74

* cited by examiner

*Primary Examiner* — Jason D Shanske
*Assistant Examiner* — James J Triggs
(74) *Attorney, Agent, or Firm* — SOROKER AGMON NORDMAN RIBA; Sharone R. Godesh

(57) ABSTRACT

The drivetrain system disclosed uses a controlled slip between an electric motor and one or more driven wheels to unify propulsion and regenerative braking. A planetary gearset (or similar two degrees-of-freedom gearing) connects the motor to the wheel, with a friction brake applied to one gear element to modulate torque. The motor is actively regulated to maintain a small constant speed offset (slip) relative to the wheel's rotation. This slip allows the motor to either drive or brake the wheel depending on its direction, with the transmitted torque being inherently proportional to the applied force on the friction brake. In multi-wheel configurations, a single motor drives multiple wheels via respective gearsets, inherently apportioning torque between wheels like a limited-slip differential without separate differential hardware. The result is a highly efficient, bidirectional drive and braking system that recovers energy, eliminates coasting drag, and uses existing brake components for torque control.

20 Claims, 6 Drawing Sheets

BIDIRECTIONAL SLIP-CONTROLLED ELECTRICAL DRIVE AND BRAKING SYSTEM WITH INTEGRATED DIFFERENTIAL FUNCTIONALITY

TECHNICAL FIELD

The present invention relates to electromechanical drive systems. More specifically, it concerns a unified speed-controlled electric motor transmission that employs a controlled slip interface for both propulsion and regenerative braking, while also providing inherent torque distribution (differential functionality) between multiple driven wheels.

BACKGROUND

Electric vehicle drivetrains often face a design trade-off between coasting efficiency and regenerative braking capability. In many direct-drive electric vehicles (where the motor is directly coupled to the wheels to enable regeneration), the motor creates drag when the vehicle is coasting, as it is back-driven even with no throttle. Conversely, vehicles that use one-way clutches or freewheeling gear systems to eliminate coasting drag typically cannot perform regenerative braking when coasting, since the motor is disconnected during freewheel. This means they must forgo energy recovery and use friction brakes for all braking, losing an opportunity to improve efficiency.

Multi-wheel drive systems add further complexity. Traditional solutions for driving two or more wheels include mechanical differentials, multiple motors (one per wheel or axle), or electronically controlled clutches. Conventional differentials are bulky and add mechanical loss, and they often lack the ability to limit slip without additional mechanisms. Using dual motors allows independent control but at high cost and complexity, and still may require coordination for differential action. Dedicated clutches are complex and induce a delay. Some systems rely on expensive torque sensors or complex electronic controls to distribute torque and maintain traction (e.g. anti-slip or torque vectoring systems). In summary, existing approaches either suffer energy losses during coasting, lack regenerative braking in some modes, limits performance and safety, or require complex hardware to manage multi-wheel drive torque distribution.

There is a need for a more efficient and mechanically simple drivetrain that unifies propulsion and regenerative braking while inherently handling multi-wheel traction distribution. Such a system should eliminate coasting drag without sacrificing regenerative (regen) energy capability, and it should provide the functionality of a differential without a dedicated differential gear assembly or multiple motors. It should leverage existing vehicle components where possible (for example, standard brake hardware) and avoid the need for additional sensors or elaborate control algorithms.

SUMMARY

The disclosure provides a bidirectional torque slip-controlled electrical drive and Braking System with integrated differential functionality, comprising a drivetrain architecture that uses a constant low-speed slip to seamlessly blend driving and braking functionalities. In one aspect, the system comprises an electric motor coupled to a driven output, e.g., a wheel through a planetary gearset (or similar two degree-of-freedom gearing). A friction brake is attached to one member of the gearset to create a resistive element. The motor is controlled in a closed-loop fashion to maintain a slight rotational speed difference (offset) between itself and the wheel, effectively creating a continuously slipping interface within the gearset. By selecting the sign of this slip (motor slightly faster or slightly slower than the wheel's would-be synchronous speed), the system can produce positive drive torque or negative (regenerative braking) torque on the wheel. The magnitude of the torque transferred is automatically proportional to the braking force applied by the friction brake—essentially using the brake as a controllable clutch that governs torque flow. Notably, the motor's speed control, rather than direct torque control, is what enables this behavior; the motor "fights" to maintain the fixed speed offset, and in doing so, it generates whatever torque is required up to its limits.

In another aspect, the architecture is inherently applicable to multi-wheel drive configurations without requiring a separate differential mechanism. For example, in a two-wheel drive setup, each driven wheel is connected to the motor via its own planetary gearset, with the motor driving a common element of both gearsets (such as the sun gear). All driven wheels share the same motor and the same controlled slip principle. The system's controller can set the motor's target speed based on a function of both wheel speeds (such as an average), ensuring that the motor maintains the slip relative to the overall vehicle movement. If one wheel encounters less resistance (e.g. slipping on ice), it will spin slightly faster, but the fixed slip constraint means the other wheel still receives torque-thus naturally limiting slip like a limited-slip differential. In effect, the differential action emerges from the gearset and slip control physics: the wheel with lower traction simply experiences less torque (since it can spin with the small slip speed more easily), while the wheel with higher traction receives more torque (as it provides more resistance to the motor's slip). This occurs without any dedicated torque-biasing differential or complex electronics; the balanced slip control inherently distributes power where needed.

A key advantage of the system is that it eliminates the need for torque sensors or precise torque commands. The driver's intent is conveyed through brake pressure and/or throttle, and the system responds by adjusting speed difference. For instance, pressing on a brake (or a specialized "drive control" pedal) increases pressure on the friction brake in the gearset, which the motor interprets (via the increased resistance to maintaining slip) as a command for more torque-either driving torque if the motor is set to run ahead of the wheel, or braking torque if it is set behind. The entire control can be achieved with a single feedback loop maintaining speed, making it mechanically and electronically simple. Transitions between driving and braking are smooth because they merely involve the motor crossing from leading to lagging the wheel speed. When the driver lets off the controls (no throttle, no brake), since the brake is not applying friction the motor is disengaged from the wheel and can idle to a standstill, resulting in true zero-drag coasting with neither drive nor regen torque, another improvement over conventional direct-drive regen systems.

Energy efficiency is also a highlight of this disclosure. The slip speed (the RPM difference across the friction interface) is kept intentionally low (for example, on the order of 5-20 RPM) regardless of vehicle speed. Because the power lost to friction ($P\_loss$) is the product of torque ($T$) and slip speed ($\omega\_slip$), whereby: ($P\_loss = T * \omega\_slip$), keeping $\omega\_slip$ very small means the friction losses are minimal even when transmitting large torque. Essentially, the brake in the system is almost locked (rotates at only a tiny relative motion), so almost all the motor's power goes into driving the vehicle or charging the battery, rather than heating the brake. In practice, this allows continuous operation in slip mode with negligible wear and heat. The friction brake element remains mostly cool and only experiences wear proportional to the small slip. This is in contrast to traditional friction brakes, which see high speeds and temperatures during braking; here the brake is used more like a persistent low-speed clutch. The system can therefore use standard brake components or improved friction materials (for example, composite brake pads or a wet brake bath) to achieve a long service life. In some embodiments, especially those using an oil-cooled (wet) friction interface, the friction elements can last for the life of the vehicle with minimal maintenance, since the stress per use is so low.

In summary, the disclosure unifies propulsion and braking in a single electromechanical system that also functions as a differential for multi-wheel drives. It leverages a planetary gearset (or analogous gearing) and a conventional brake to create an elegantly simple transmission. The motor's speed is the primary control variable, and a fixed slip strategy yields automatic torque modulation. The result is a drivetrain that offers regenerative braking, coasting without drag, distributes torque between outputs without a dedicated differential, and reduces component count by using one motor and one brake system for multiple functions. Various embodiments, including automotive and motorcycle implementations, demonstrate the flexibility of the concept, which can be applied to many types of vehicles or other machinery requiring efficient bi-directional torque control.

According to some embodiments, the present disclosure provides a bidirectional slip-controlled drivetrain system, comprising:
  a two degrees-of-freedom gearset having a first member coupled to a driven output, a second member coupled to an electric motor, and a third member coupled to and braked by a friction brake mechanism; and
  a Set Point controller is configured to command the electric motor to maintain a controlled predetermined rotational speed offset relative to a reference speed of the driven output.

In some embodiments, the controlled speed offset causes a continuous slip of the braked member such that torque is transferred between the electric motor and the driven output in both driving and regenerative braking modes, whereby the magnitude of the torque transferred is proportional to an applied force on the friction brake mechanism.

Optionally, the two degrees-of-freedom gearset may be a planetary gearset.

In some embodiments, the controlled speed offset maintained by the Set Point controller is a fixed RPM difference, thereby maintaining a constant slip during both driving and braking.

In some embodiments, the system may further comprise a plurality of two degrees-of-freedom gearsets, each coupled to a respective driven output. The electric motor may be operatively connected to a common member of all of the plurality of gearsets to drive the plurality of driven outputs together.

In some embodiments, the Set Point controller may determine the reference speed as a function of the rotational speeds of the driven outputs.

Optionally, the reference speed function may be a limited average of the rotational speeds of the driven outputs, set to prevent any one driven output from exceeding a slip threshold, thereby simulating a limited-slip differential behavior among the plurality of driven outputs.

Optionally, the friction brake mechanism may comprise a brake selected from a group consisting of: a disc brake, a drum brake, a multi-plate clutch or brake pack, a motor, or any equivalent device capable of controllably resisting rotation.

In some embodiments, during driving mode the electric motor may be controlled to run slightly faster than the driven output's speed so as to generate drive torque and during braking operation the electric motor may be controlled to run slightly slower than the driven output's speed, so as to generate braking torque in response to engagement of the friction brake mechanism, the electric motor thereby delivering torque to maintain the slip against a resistance of the brake.

Optionally, the speed offset between the electric motor and the driven output may be maintained at a fixed or variably adjusted value, and the controlled speed offset is optionally increased or decreased based on operating conditions including but not limited to turning behavior, load distribution, thermal considerations, or efficiency optimization.

In some embodiments, electric motor acceleration and deceleration are selectively limited based on indicators of potential traction loss, such that a controlled slip margin is maintained to prevent wheel lock or spin.

Optionally, the indicators are based on the proximity of wheel speed to motor speed.

In some embodiments, the applied force on the friction brake mechanism may be indirectly precisely inferred from the magnitude of the electric motor torque.

In some embodiments, each of the plurality of gearset is equipped with an independently controllable friction brake mechanism, and
  a. an anti-lock braking function may be provided by modulating a brake pressure at each gearset to maintain a small non-zero slip and prevent driven output lock during braking, and
  b. torque vectoring between multiple driven outputs may be achieved by adjusting the brake pressure at individual gearsets.

In some embodiments, the plurality of driven outputs comprise multiple wheels, multiple axles, or axle-groups driven through respective gearsets, with or without at least one conventional mechanical differential, such that localized braking at each gearset provides torque modulation across independently or rigidly coupled driven outputs.

Optionally, the gearsets for each driven output are of different topologies and ratios.

In some embodiments, the system may further comprise a one-way clutch coupled between elements of the gearset, the one-way clutch being oriented such that when the electric motor rotates in a first direction, the one-way clutch locks to directly drive the driven output without slip in direct-drive mode, and when the electric motor rotates in the opposite direction, the one-way clutch frees, forcing torque transfer through the gearset with a controlled slip mode engaged.

Optionally, a first user-operated input and electric motor throttle are used in combination to initiate driving torque in the controlled slip mode, and a second user-operated input separately initiates regenerative braking mode, the assignment of the first and second user-operated inputs to driving or braking functions being configurable.

In some embodiments, during the controlled slip mode a throttle input may define a maximum motor torque output, while the actual torque transmitted to the driven output may be determined by the resistance imposed by the friction brake mechanism, such that the throttle sets an upper limit and the applied force on the friction brake mechanism modulates the effective torque within that limit.

In some embodiments, in the direct-drive mode, the throttle commands motor torque directly to the driven output, and in the slip-controlled mode, the motor's torque to the driven output is automatically modulated in response to the friction brake engagement.

In some embodiments, the first and second user-operated input devices may be selected from a group comprising: a hand lever, a foot pedal, or any other similar device, and the functional roles of the input devices are assignable or interchangeable by design.

BRIEF DESCRIPTION OF THE DRAWINGS

Some non-limiting exemplary embodiments or features of the disclosed subject matter are illustrated in the following drawings.

In the drawings.

Figure 1:
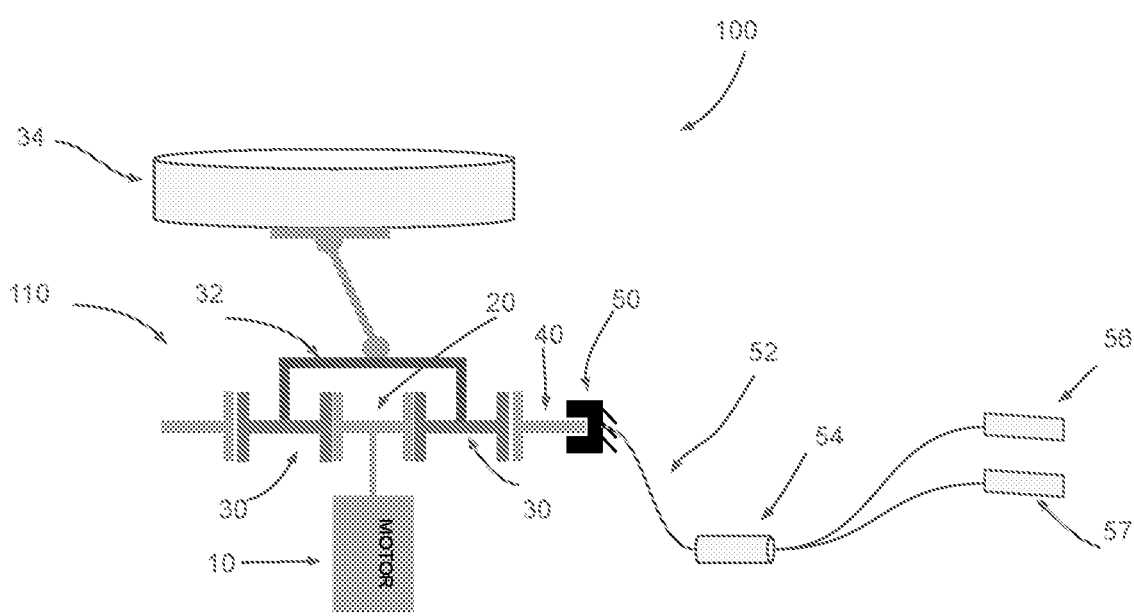
FIG. 1 is a schematic diagram of a slip-controlled drivetrain system for a single wheel, illustrating a planetary gearset coupled to a driven output with a friction brake on one gear member and an electric motor driving another member.

With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspectives or from different point of views.

DETAILED DESCRIPTION

Single-Wheel Slip-Controlled Drivetrain (FIG. 1): Referring to FIG. 1, which is a schematic diagram of a slip-controlled drivetrain system (100) for a single driven output. FIG. 1 illustrates a basic embodiment of the system is depicted for a single drive wheel. A two degrees-of-freedom gearset, e.g., planetary gearset (110) is used to interconnect the motor (10) and the wheel (34). In the illustrated configuration, the electric motor (10) is connected to the sun gear (20) of the planetary set (110). The wheel (34) is coupled to the planetary carrier (32) which holds the planet gears (30). The ring gear (40) serves as the reaction member in this example and is coupled to a friction brake mechanism, shown here as a brake caliper (50) acting on a brake disc attached to the ring gear (40). The brake caliper (50) is actuated via a hydraulic line (52) fed by a master cylinder (54) connected to a brake pedal (56) and a drive pedal (57).

When neither drive pedal (57) nor brake pedal (56) is applied by the user, the torque command is zero and the ring gear (40) is not restricted by the brake caliper (50). The motor (10) is then mechanically disengaged and free to rest—resulting in a coasting state. In this state, the vehicle can roll freely, without any drag from the motor (10). To initiate propulsion (i.e., drive torque to the wheel (34)) following an input command, possibly indicated by the application of the drive pedal (57), the system (100) introduces a small positive slip: the controller (e.g., Set Point controller (410), FIG. 4) commands the motor (10) to run slightly faster than it would at a pure synchronous speed with the wheel (34). For example, if the wheel (34) is rotating at a speed corresponding to 1000 RPM motor-speed under the fixed gear ratio, the Set Point controller (410) might command the motor to 1010 RPM, introducing a +10 RPM slip. Set Point controller (410) is configured to command the electric motor (10) to maintain a predetermined rotational speed offset relative to a reference speed of the driven output, such to maintain a fixed RPM difference, thereby maintaining a constant slip during both driving and braking. This means the sun gear (20) is trying to turn a bit faster than the carrier (32) would dictate, which causes the planet gears (30) to push against the ring gear (40). If the ring gear (40) were free, the slip would simply result in the ring gear (40) spinning; however, as the user activates the drive pedal (57)), the brake caliper (50) starts to clamp the ring gear (40) which resists the motion. The motor (10), still attempting to turn 10 RPM faster, now develops a torque action: it applies force through the planet gears (30) to the planet carrier (32), thus driving the wheel (34) forward. The greater the drive pedal (57) is applied, the greater the braking force on the ring gear (40), and in turn, the greater the action torque that is generated by the motor (10) to the wheel (34). In this manner, the friction brake on the ring gear (40) governs how much of the motor's effort is translated into driving the vehicle.

Conversely, to initiate regenerative braking, possibly indicated by the application of the brake pedal (56), the Set Point controller (416) commands the motor (10) to run at a slight negative slip relative to the wheel (34). Using the earlier example, if 1000 RPM is the synchronous speed, the Set Point controller (410) may command the motor (10) to 990 RPM (i.e., 10 RPM slower). Now, the wheel (34), which is moving faster via the vehicle's momentum, drives the planetary carrier (32) a bit ahead of the sun gear (20). The planet gears (30) attempt to turn the sun gear (20), but the motor (10) resists being driven above 990 RPM. Since the user presses the brake pedal (56) (applying the brake caliper (50) on the ring gear (40) again), the ring gear (40) is held, and the motion of the planet carrier (32) forces the sun gear (20) to drive the motor (10). The motor (10), in trying to maintain its slightly slower speed, produces a counter-torque which absorbs energy from the wheel (34). This energy is converted by the motor (10) into electrical energy (which can be fed back into a battery, for example). The braking torque on the wheel (34) is proportional to how hard the ring gear (40) is braked by the caliper (50), i.e., how much resistance the friction brake provides. If the brake pedal (56) is applied more firmly, the motor (10) must work harder to maintain the negative −10 RPM slip, thus applying more negative torque.

It is important to note that in both the driving and braking scenarios described, the same hardware is used, and only the motor's speed relative to the wheel changes its sign. The friction brake (50) is used in a continuous slip manner rather than as an on/off brake. Because the slip speed is fixed and small, the friction interface (between the brake pad and ring gear/disc) experiences only minimal movement while transmitting torque. As a result, the friction brake effectively modulates torque without significant wear or heat, acting analogously to a clutch. The motor's role is to maintain the set slip speed; it inherently provides whatever torque is necessary (within its capabilities) for doing so. This elegant control means that the system does not require explicit measurement or feedback of torque. The motor current or effort adjusts to whatever level is needed to counter the braking force at the ring gear.

Figure 4:
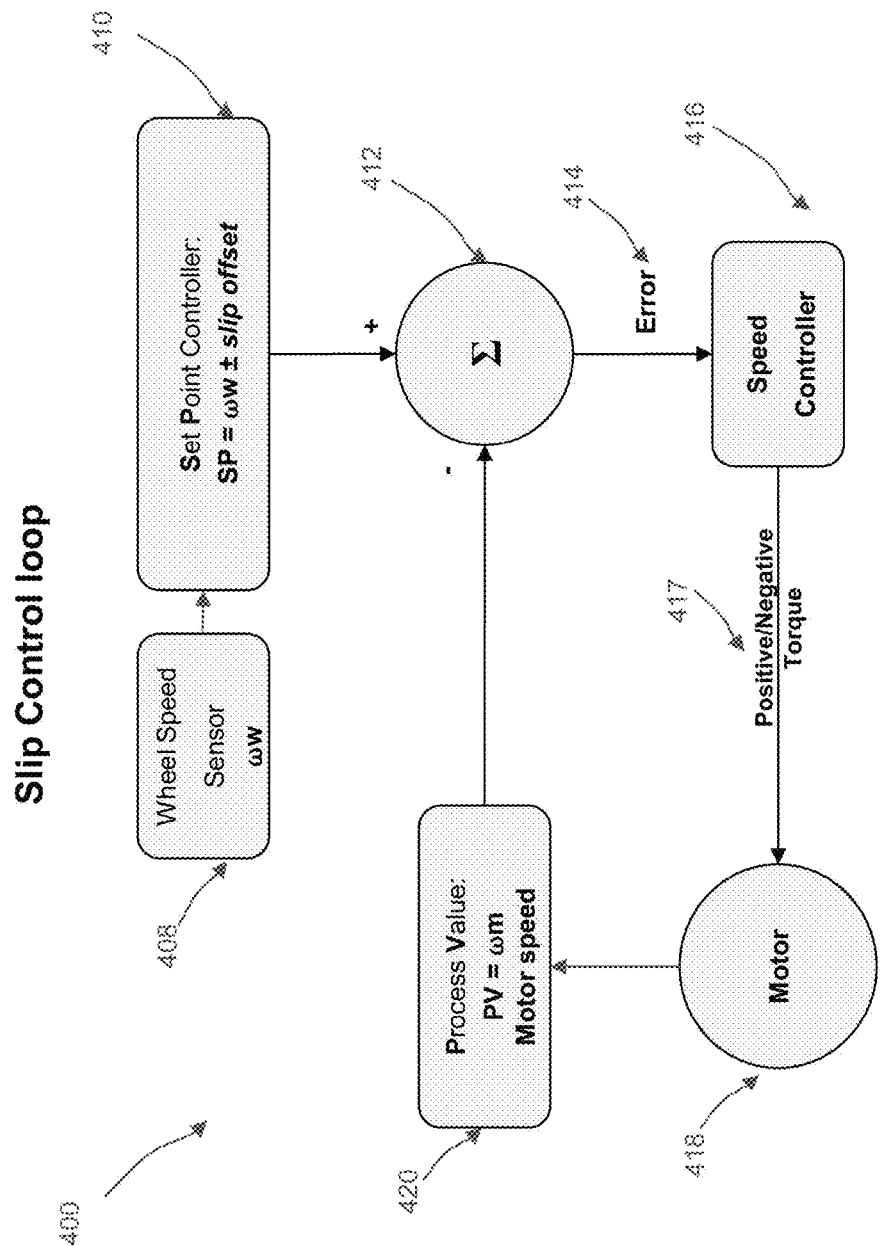
FIG. 4 is a block diagram of a closed-loop control system for maintaining a target slip speed in a single-driven output configuration.

Closed-Loop Slip Control (FIG. 4): Reference is now made to FIG. 4, which is a block diagram of a closed-loop control system for maintaining a target slip speed in a single-driven output configuration (which is illustrated in FIG. 1). FIG. 4 illustrates a control loop diagram for a single-wheel system. The control loop diagram (400) shows the motor speed (ωm) feedback and wheel speed (ωw) input being compared to produce an error (414) that is used to control motor torque (417), thereby regulating slip. The speed controller (416) uses feedback from the wheel speed (ωw) and motor speed (ωm) to regulate this slip condition. A wheel speed sensor (408) provides the wheel's angular velocity (ωw) (for example, derived from wheel (34) rotation or ABS sensors already present in a vehicle). Set Point controller (410) computes a target motor speed (set point, SP) equal to the wheel speed (ωw) (multiplied by the gear ratio) plus a desired slip offset. The desired slip offset or the predetermined rotational speed offset, can be positive (for drive) or negative (for braking), typically a fixed RPM value, e.g., ±10 RPM or a small percentage of the wheel speed. The actual motor speed (ωm) (process value, PV) is measured by a motor speed sensor (420) or by the motor's internal encoder. The speed controller (416) compares (ωm) to the target SP (at operation (412)) and computes an error (414) (e.g., by calculating the sum of SP−PV). The speed controller (416) then adjusts the motor's input (for example, voltage or current) to drive this error (414) toward zero. If the motor (e.g., motor (10)) is too slow (error is positive), the speed controller (416) increases motor torque to speed it up; if the motor is too fast (error is negative), speed controller (416) commands regenerative braking torque to slow it down. In effect, the motor constantly tries to follow the moving target (i.e., wheel speed±offset). The friction brake's pressure is not directly controlled by this loop (400); instead, the brake's pressure is typically commanded by the driver's action (or another higher-level control input), and it influences the outcome by changing how much torque is required to maintain the slip. This closed-loop speed control (400) is high-response and can adjust motor torque very rapidly, which is important for maintaining stability and responsiveness. Because the system operates on maintaining a speed difference rather than a specific torque, it inherently avoids sudden jumps in torque—any increase in brake force smoothly translates to an increase in motor torque, and vice versa, in a proportional manner.

Symmetric Drive and Brake Operation: The operation described hereinabove is symmetric with respect to driving and braking. The transition from drive to regenerative braking is simply a matter of the motor's target to cross the actual wheel speed (ωw). For example, if the slip target is ±10 RPM, commanding a +10 RPM slip (i.e., motor is to rotate faster) will pull the vehicle forward, and commanding a −10 RPM slip (i.e., motor is to rotate slower) will slow the vehicle down. If the driver is applying a certain brake pressure and the motor slip target is gradually moved from +10 to −10, the wheel will smoothly go from receiving power to delivering power to the motor (regen) without any discontinuity. This gives the vehicle a very natural feel, akin to an engine providing propulsion when accelerating and engine braking when decelerating, all using the same connection. Importantly, if the driver completely releases both the throttle and the brake, the speed controller (416) can set the motor torque to zero, meaning the motor simply idles to a standstill; in this state, no torque is exchanged and the vehicle coasts freely. This behavior addresses the coasting drag problem—unlike a traditional direct-coupled motor, which would cause drag when unpowered, here the motor idles at zero speed with no resistance.

Motor-Based ABS and Traction Control: The system's reliance on motor speed control enables built-in ABS and traction control functionality. As the wheel-speed approaches the motor-speed—indicating the collapse of the desired slip target—the system infers an impending loss of traction. To maintain stability, it dynamically limits the motor's rate of acceleration or deceleration, thereby preserving a slip margin between the motor and wheel speeds. This continuous adjustment ensures controlled slip and effective torque modulation under varying surface and load conditions, without requiring additional sensors or mechanical subsystems. The electric motor (10) acceleration and deceleration are selectively limited based on indicators of potential traction loss, such that a controlled slip margin is maintained to prevent wheel lock or spin.

Figure 2:
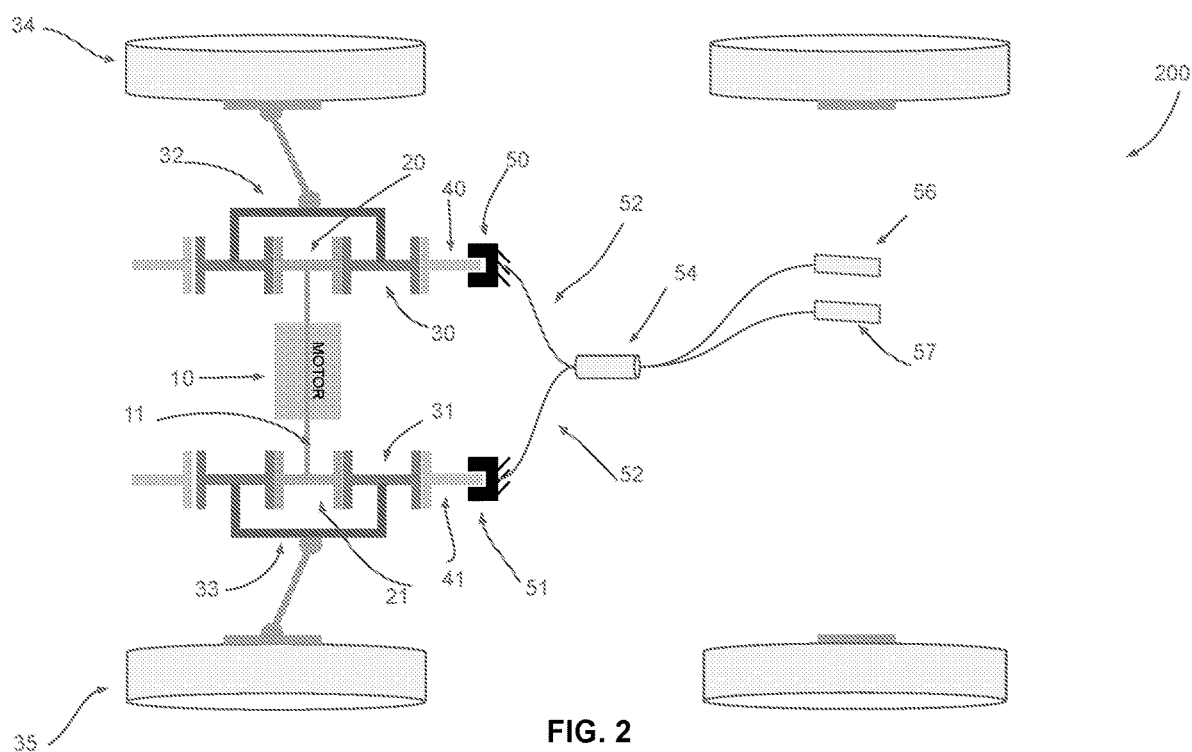
FIG. 2 is a schematic diagram of a dual-driven output drive system using a single electric motor and two planetary gearsets (one per driven output) with a shared brake control, illustrating how a common slip control is applied to both driven outputs.

Multi-Wheel Drive with Shared Motor (FIG. 2 & FIG. 5): Reference is now made to FIG. 2, which is a schematic diagram of a dual-driven output drive system (200) using a single electric motor and two planetary gearsets (one per wheel) with a shared brake control. The disclosure extends to multiple driven wheels, and not just to a single wheel as described hereinabove. FIG. 2 shows an embodiment with two driven wheels, a left wheel-L (34) and a right wheel-R (35), using one motor (10). In this configuration, each wheel (34, 35) has its own planetary gearset: a left-side sun gear (20) and right-side sun gear (21), which are both driven by the single motor (10). For example, the motor's shaft (11) may be connected to both sun gears (20, 21) via a common member, i.e., shaft (11) or through a splitter gear (not shown). The left wheel (34) is attached to the left planet carrier (32), and the right wheel (35) is attached to the right planet carrier (33). The left ring gear (40) is braked by a left brake caliper (50), and the right ring gear (41) is braked by a right brake caliper (51). In the embodiment of FIG. 2, both brake calipers are actuated together by a shared hydraulic circuit, e.g., a single master cylinder (54) connected to a brake pedal (56) and a drive pedal (57). The single master cylinder (54) splits via two lines (52) feeding both calipers (50) and (51). Thus, both ring gears (40, 41) receive the same brake pressure simultaneously.

Figure 5:
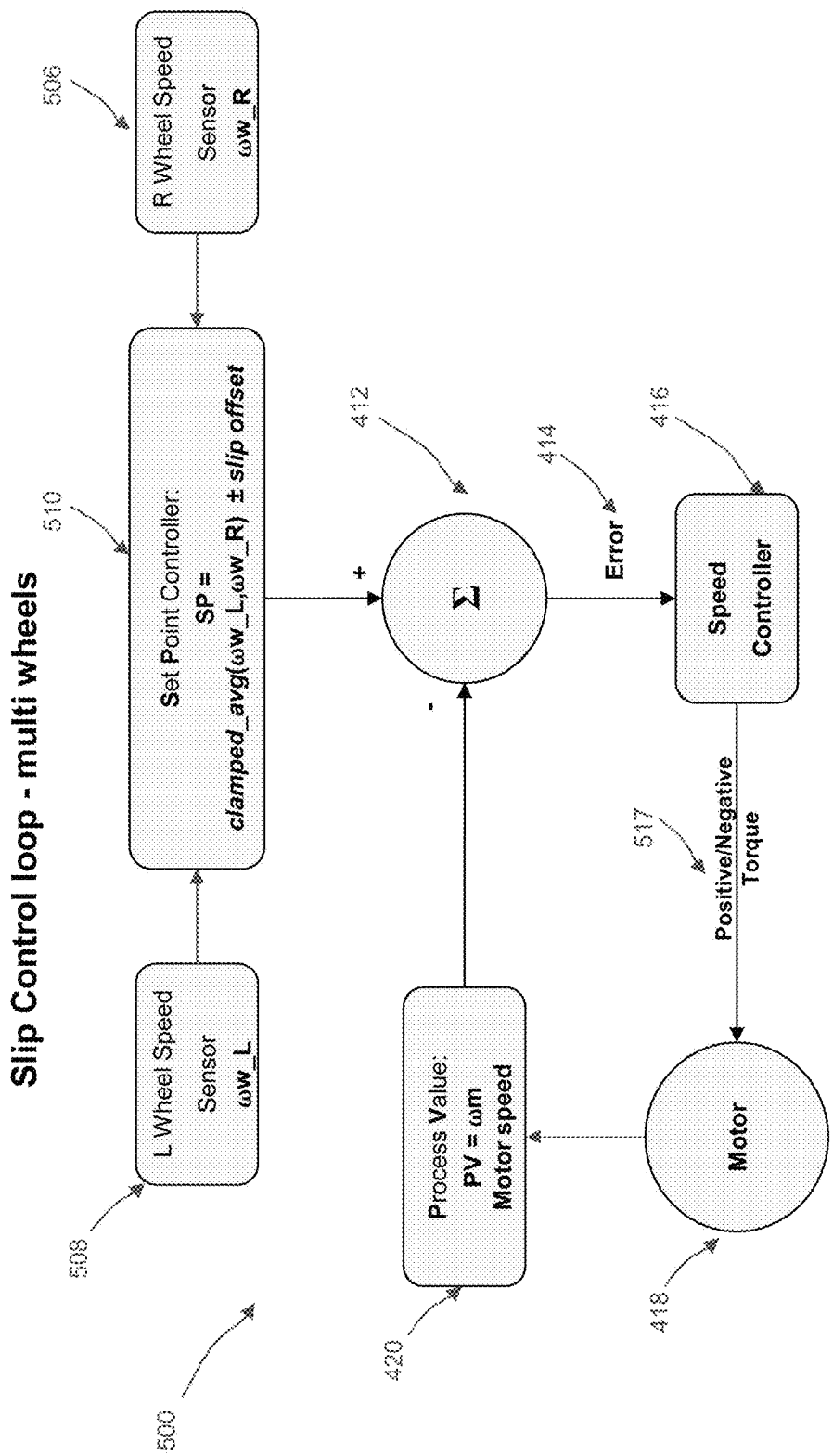
FIG. 5 is a block diagram of a closed-loop slip control system for a multi-driven output (e.g., two-wheel) configuration.

When the motor (10) is commanded to maintain a slip relative to the average wheel speed, the system will distribute torque between the two wheels as needed. FIG. 5 illustrates the control logic for this multi-wheel scenario. FIG. 5 is a block diagram of a closed-loop slip control system for a multi-wheel (e.g., two-wheel) configuration. FIG. 5 illustrates how the Set Point controller (510) uses a clamped average of multiple wheel speeds to set the motor's target speed, ensuring balanced slip and preventing excessive spin or lock on either wheel.

The left wheel speed ωw_L and right wheel speed ωw_R are both measured by a corresponding wheel speed sensor, i.e., left wheel speed sensor (508) for the left wheel (34) and right wheel speed sensor (506) for the right wheel (35). The Set Point controller (510) computes a reference speed or target speed SP for the motor (10), as a function of the rotational speeds of the driven outputs. For example, the function could be a simple average (ωw_avg=(ωw_L+ ωw_R)/2) plus the slip offset. In practice, to ensure stability, a clamped average or biased selection may be used: for example, in regenerative braking mode, the Set Point controller (510) might use an average limited to about 20% below the faster wheel, so that it does not attempt to brake any wheel to a much slower speed than the fastest wheel which has best traction (preventing wheel lock-up). In drive mode, it might use an average limited to about 20% above the slower wheel so as not to overspin a wheel that has lost traction. This approach of clamping ensures one wheel slipping excessively will not result in the loss of traction typical to open differentials. The motor's actual speed (PV) in operation (420) is compared by the speed controller (416) to the target speed SP, in operation (412), and the speed controller (416) adjusts torque as described for the single-wheel case hereinabove. That is, the reference speed SP is limited to prevent any one output from exceeding a slip threshold, thereby simulating a limited-slip differential behavior among the plurality of driven outputs.

The effect of this control in FIG. 2 is that if one wheel starts to slip (loses traction), its speed will rise relative to the other wheel. The Set Point controller (510), using an average of wheel speeds, will adjust the motor target speed in response to that average speed, but since the average function is capped, i.e., limited, the motor target speed will only rise modestly as limited by the cap. The slipping wheel will spin at the motor speed, and the majority of the brake reaction torque will automatically go into the wheel with more grip because that wheel isn't spinning freely; it resists the motor's slip, drawing more torque. That is, the system (200) naturally allocates more torque to the slower wheel (the one with traction) and limits torque to the faster wheel (the one slipping or with less traction). This behavior mimics a limited-slip differential without needing complex clutch packs or electronics between wheels.

In normal operation on a high-traction surface, both wheels (34, 35) will rotate at nearly the same speed. The Set Point controller (510) will see nearly equal wheel speeds and use their average plus slip for the target speed SP. Both wheels (34, 35) will receive equal torque because the brake force on both ring gears (40, 41) is the same and both wheels (34, 35) resist similarly. When the vehicle is turning, the wheels (34, 35) inherently rotate at different speeds, such that the outside wheel, i.e., the wheel farther from the turning point, goes faster. In this case, the planetary gearsets (30, 31) allow differential action: the faster wheel's gearset will experience slightly less slip internally than the slower wheel's gearset. The slip speed between the motor and the driven output (e.g., a wheel) is maintained at a fixed or variably adjusted value, and the target slip speed is optionally increased or decreased based on operating conditions including but not limited to turning behavior, load distribution, thermal considerations, or efficiency optimization. Optionally, as the turn gets tighter indicated by the faster wheel approaching motor speed the target slip speed can be gradually increased to support the turn and as the turn gets wider the target slip speed can be gradually reduced to maintain efficiency. The driver perceives normal differential behavior, with the added benefit of automatic traction control if one wheel loses grip.

In some embodiments, the gearsets for each of the plurality of driven outputs, e.g., wheels (34) and (35), are of different topologies and ratios.

Figure 3:
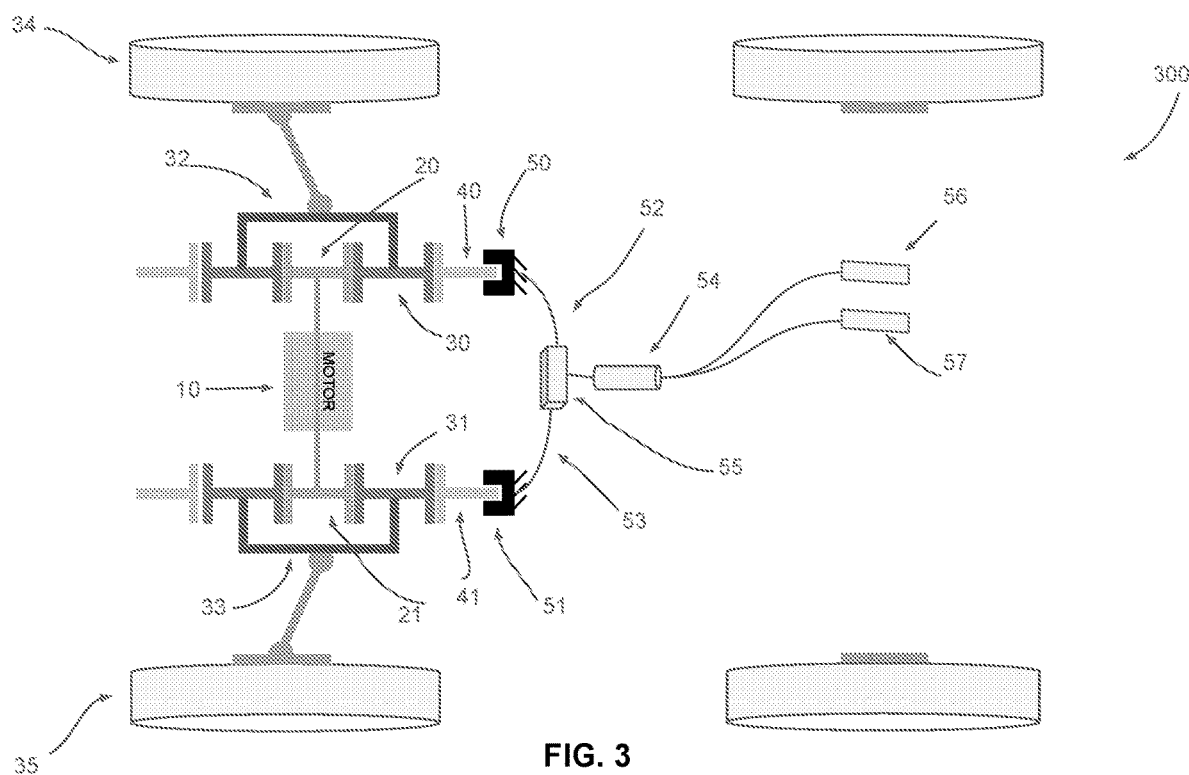
FIG. 3 is a schematic diagram of a dual-driven output drive system similar to FIG. 2, but with independent braking control for each driven output via separate brake lines and a brake pressure modulator.

Independent Wheel Brake Control (FIG. 3): Reference is now made to FIG. 3, which is a schematic diagram of a dual-driven output drive system similar to FIG. 2, but with independent braking control for each driven output via separate brake lines and a brake pressure modulator, enabling individual wheel slip control (e.g., for ABS or torque vectoring). In an alternative multi-wheel embodiment illustrated in FIG. 3, the system (300) includes separate control of the brake mechanisms on each wheel (35, 35). This embodiment adds a brake pressure modulator (55) or any similar device that can independently adjust the pressure in the left and right brake lines (52 and 53, respectively), even if they originate from the same master cylinder (54). The motor (10) and planetary gear (30, 31) connections remain the same as in FIG. 2, which comprises motor (10) driving sun gears (20 and 21); wheels (34, 35) connected to carriers (32, 33); brakes connected to ring gears (40, 41) via calipers (50, 51). However, in the embodiment illustrated in FIG. 3, a control system can vary the brake pressure at each caliper (50, 51) separately. This allows finer control, such as anti-lock braking and active torque vectoring.

For instance, if during a braking event the left wheel (34) starts to approach lock-up (indicated by ωw_L dropping rapidly to motor speed, adjusted by gear ratio, without slip), an ABS algorithm can momentarily reduce pressure to the left caliper (50) via the modulator (55) to prevent that wheel from fully locking. It is noted that the speed of a "locked" wheel is equal to motor speed, not zero. The right wheel's brake can remain engaged as normal. The motor (10) in this scenario is providing regenerative braking torque through both gearsets, but by relieving pressure on the left side, the left wheel (34) is allowed to regain some traction and avoid skidding, all while the right wheel (35) continues to brake harder. Because the motor's slip target would be set based on the wheels, e.g., the fastest wheel to avoid any wheel locking, as per the clamped-average logic (see above description of FIG. 5), the motor (10) will adjust to the new conditions seamlessly. The outcome is that each wheel maintains a controlled slip ideal for maximum deceleration without lock-up, achieving superior ABS functionality with essentially the same hardware plus a small pressure control unit modulator (55).

In drive mode, independent control of brake pressure can similarly allow torque vectoring or stability control. By increasing brake pressure on one side, the system (300) can send more driving torque to that wheel, since the side with more brake effectively "drags" more, the motor (10) reacts by pushing harder. This could help, for example, to correct an understeer or oversteer condition by biasing torque distribution, or to enhance cornering by driving the outer wheel more than the inner wheel deliberately. Importantly, these advanced functions are achieved without needing multiple motors or complex differentials, but rather they are a straightforward extension of the slip-control concept with added brake control logic.

Whether using a shared brake line (FIG. 2) or independent brake lines (FIG. 3), the system of the present disclosure maintains the benefit of not requiring any torque sensors. The coordination between wheels is achieved through mechanical means (the gearsets and the slip dynamics) and simple speed sensing. This simplicity improves performance and reliability and reduces cost compared to current solutions.

Friction Brake Considerations: The friction brake mechanisms used in systems (100), (200) and (300) can be conventional vehicle brakes—for example, disc brakes with calipers and pads, drum brakes, multi-plate clutch or brake pack, a motor, a wet multi-plate brake, or any equivalent device capable of controllably resisting rotation. Since the brake is used constantly but primarily to create a resistive torque under slow slip, it operates in a very favorable condition: low relative velocity and typically moderate force. This is quite different from a standard braking scenario, which is often defined by high speed and high energy dissipation in a short time. Therefore, the systems of the present disclosure can take advantage of materials and designs optimized for continuous slip. For instance, pads made of sintered metals or Kevlar-based composites might be used because they handle continuous friction well and have low wear at low temperatures. In heavy-duty or long-life applications, a wet brake system (immersed in fluid) could be employed to further reduce wear.

Control Simplicity and Brake Blending: In contrast to conventional brake blending systems, which coordinate torque between independent friction brakes and regenerative motors, the present disclosure unifies all torque delivery and absorption through a single mechanical interface. Braking and propulsion are both mediated by controlled motor slip against a friction brake within the planetary gearset, eliminating the need to synchronize two separate torque sources. This architecture avoids the calibration complexity, latency, and instability associated with traditional brake blending. Because the motor torque is inherently modulated in response to brake force, transitions between drive and regenerative braking are seamless and sensor-minimal. The result is a simpler, more robust system that delivers smoother performance and higher overall control fidelity. The motor and brake essentially perform a mechanical negotiation: the brake tries to hold the ring gear, the motor tries to overcome or succumb to that hold by maintaining slip, and the wheel in between reacts accordingly.

Safety: There is an inherent failsafe in the system of the present disclosure: if the motor short-circuits and freezes, brake pressure will not be applied (or immediately stopped), enabling true mechanical disengagement that will prevent a dangerous sudden deceleration of the vehicle . . .

User Inputs and Interface: In all of systems (100), (200) and (300), the exact way a driver commands drive or braking torque can be adapted to the vehicle type. In one interpretation, pressing the accelerator could signal the set point controller to apply a positive slip (drive mode) and also possibly engage a mechanism to apply pressure to the brake calipers. Alternatively, a one-pedal interface can be implemented, automating both brake and drive according to pedal position. Alternatively, as conceptually shown in FIG. 1, there could be two pedals (56 and 57, FIG. 3) that both connect to the brake system: one labeled or functioning as a "brake" (for regen-braking) and the other as a "drive". Both pedals actually apply brake pressure, but trigger the motor to brake or drive accordingly. This dual-pedal approach is unconventional in cars but it is optionally suitable for simple vehicles such as ATVs and it illustrates the symmetry of the system, i.e., that both pedals do the same thing-apply pressure to the brake caliper, but the Set Point controller interprets one as a command to enter drive mode (i.e., to implement a positive slip) and the other as a command for brake mode (i.e., to implement a negative slip).

Scalability: The architecture of the present disclosure is highly scalable and adaptable to a wide range of on-road, off-road and industrial configurations. A single motor can drive multiple driven outputs, e.g., wheels, axles, or axle groups, either individually, in multiples, through respective gearsets or through at least one conventional mechanical differential. For example, in a heavy-duty truck, the system may be installed between two drive axles with a standard differential on each, delivering coordinated torque control without multiple traction motors. The same principles extend to rigid-axle applications such as rail vehicles, or to industrial machinery that powers banks of rollers or drive wheels. In all cases, the localized brake-and-slip module at each gearset provides precise torque modulation with minimal mechanical complexity.

Sensorless Brake Force Estimation via Motor Torque Feedback: A notable feature of the system is its inherent ability to estimate brake force without the need for dedicated pressure or force sensors. Because the motor is operated in a closed-loop speed control mode to maintain a constant slip relative to the wheel, the torque output of the motor is directly proportional to the resisting force applied by the brake. This relationship allows the system to infer real-time brake force by reading motor current or torque response, providing a passive and accurate measure of braking effort. This capability enables advanced diagnostics, predictive maintenance, and intelligent control functions such as load balancing or surface condition inference, all without adding sensors to the brake circuit.

Figure 6:
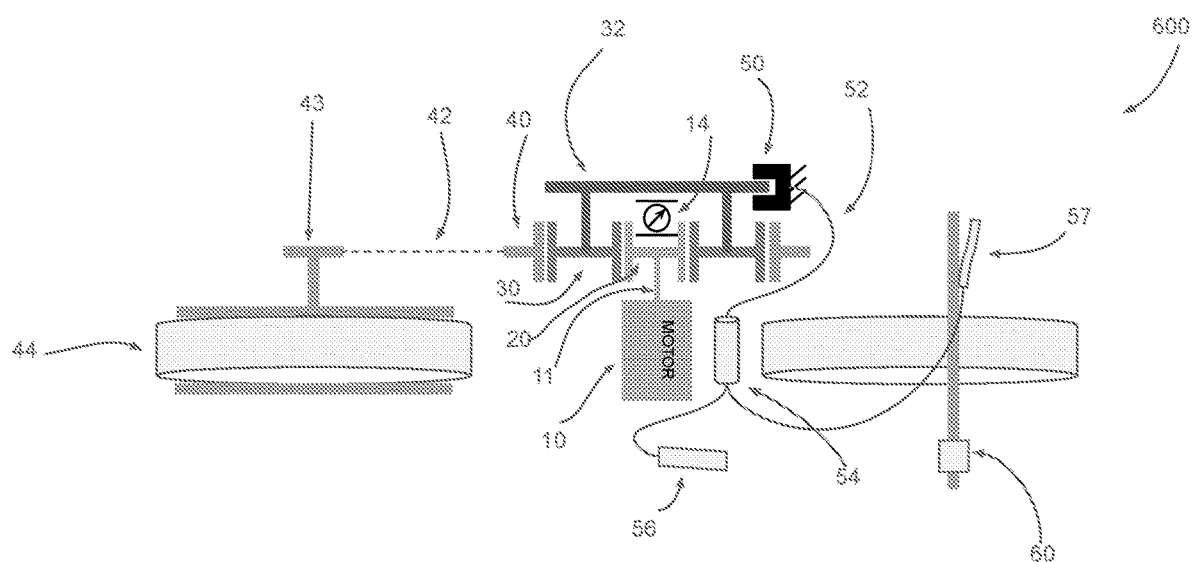
FIG. 6 is a schematic diagram of a motorcycle drivetrain embodiment incorporating a one-way clutch (bearing) in conjunction with a planetary gearset.

Motorcycle Embodiment (FIG. 6): FIG. 6 depicts a specific embodiment tailored for a motorcycle, which demonstrates the flexibility of the invention in a two-wheeler vehicle context. FIG. 6 illustrates a dual-mode operation where the motor drives the wheel directly in one direction (high gear) and through the slip-controlled planetary gearset in the opposite direction (low gear with regenerative braking), as well as the associated control inputs (throttle, brake pedal, and lever).

In a motorcycle, packaging and control feel are critical. The planetary gearset in system (600) is configured such that the planet carrier (32) is the braked element rather than the ring gear (40). The ring gear (40) is used as the output to the wheel (44). A chain (42) and sprocket (43) connect the ring gear (40) to the rear wheel (44) of the motorcycle of system (600). This is similar to a typical chain-drive motorcycle, but here the chain (42) is driven from the ring gear (40) of the planetary set. The sun gear (20) is driven by the motor (10). This embodiment introduces a one-way bearing (14), which may be installed between the motor shaft (11) and the planet carrier (32), such that when the motor (10) spins in the forward direction (the direction that would propel the motorcycle forward if directly coupled), the one-way bearing (14) locks, and the sun gear (20) drives the planet carrier (32). In this condition, the entire planetary assembly will lock up (the planetary gearset is effectively bypassed), and the motor (10) will drive the ring gear (40) at a fixed 1:1 ratio. This is the High Gear Mode or direct-drive mode.

When the rider applies the brake on the planet carrier (32) via caliper (50), the motor (10) is forced to engage in reverse direction. The motor (10) can drive or brake the ring gear (40) through the planets (30) according to the planetary gear ratio, enabling the Low Gear Mode.

The motorcycle of system (600) is equipped with conventional controls. In the embodiment illustrated in FIG. 6, a throttle (60) is on the handlebar, a brake pedal (56) for the rear brake (as common on a motorcycle, a foot pedal operates the rear brake), and a clutch lever (57) on the handlebar (which normally would disengage a clutch on a conventional motorcycle). In system (600), however, the clutch lever (57) is repurposed to actuate the brake caliper (50) on the planet carrier (32)—effectively it becomes a "low gear engage" lever. The right foot brake pedal (56) also connects to the same caliper (50) (or possibly an additional braking surface on the planet carrier (32)) to provide regenerative braking control. The throttle (60) remains controlling the motor's torque output. The system (600) operates in four distinct modes:

1. High Gear Mode (Direct Drive, 1:1)—This mode occurs when the throttle (60) is opened and the clutch lever (57) is fully released (the planet carrier (32) is not braked). The motor spins forward at the torque level indicated by the throttle (60). In this mode, the planetary gearset does not slip; it acts as a solid coupling. The throttle (60) directly controls the motor torque and thus acceleration, just like a normal motorcycle in top gear.

2. Low Gear Drive Mode (Slip-Drive)—This mode engages when the rider pulls the clutch lever (57), applying some braking force to the planet carrier (32), and opens the throttle (60). In this scenario, the motor (10) is spun in the reverse direction relative to wheel travel which means the one-way clutch (14) disengages, allowing the planetary gear to function. The Set Point controller (410, FIG. 4) sets the motor-speed slightly above the wheel-speed for forward motion through the planetary gear (i.e., a positive slip in the context of the gearset). The throttle (60) in this mode limits the motor's maximum output (like an engine governor) so the rider can modulate how much power is available, while the clutch lever (57) pressure directly determines how much of that power is actually transmitted, similar to feathering a clutch to control acceleration. That is, during the controlled slip mode a throttle input defines a maximum motor torque output, while the actual torque transmitted to the driven output is determined by the resistance imposed by the friction brake mechanism, such that the throttle sets an upper limit and the applied force on the friction brake mechanism modulates the effective torque within that limit.

3. Regenerative Braking Mode (Slip-Brake)—This mode engages when the rider presses the brake pedal (56), which engages the brake caliper (50) on the planet carrier (32). The motor (10) is spun in the reverse direction relative to wheel travel which means the one-way clutch (14) disengages, allowing the planetary gear to function. The Set Point controller (410, FIG. 4) sets the motor-speed slightly below the wheel-speed (i.e., a negative slip in the context of the gearset). The motor now acts as a generator, resisting the wheel's motion. The harder the rider presses the brake pedal (56), the more the planet carrier (32) is locked, and thus the more torque is transferred to the motor (10) for braking. The throttle is irrelevant in this mode, and can be ignored because the rider's intent is clearly to slow down.

4. Coasting—This mode engages when the rider applies neither handle pedal nor throttle, the free planet carrier (32) allows the motor (10) to idle at standstill while the motorcycle coasts without any motor-drag.

The motorcycle system (600) demonstrates that the system of the present disclosure can mimic the functionality of a multi-speed transmission while using a single gearset. The one-way clutch (14) provides an automatic shift between a direct high gear and a slip-mediated low gear. The rider's conventional controls (throttle, "clutch" lever, brake pedal) are repurposed to manage the slip system. This yields a very intuitive interface: the clutch lever (57) feels like controlling a clutch while it actually controls the friction brake (50) on the planet carrier (32), the throttle (60) works as expected, and the brake pedal (56) feels like a friction brake while it's actually regenerative. The transition between gears is seamless: for example, if the motorcycle is driving in high gear and the rider suddenly opens the throttle (60) while also pulling the clutch lever (57), e.g., as one would do to downshift or get power, the motor (10) will switch to the slip mode (reverse relative rotation) almost instantaneously and start providing torque through the planetary gear without any explicit gear change—the one-way clutch (14) simply starts overrunning. Similarly, if the rider is accelerating in low gear and then releases the clutch lever (57), the motor (10) will quickly catch up and re-engage the one-way clutch (14) into direct drive, effectively shifting up to high gear.

In some embodiments, a first user-operated input and electric motor throttle are used in combination to initiate driving torque in the controlled slip mode, and a second user-operated input separately initiates regenerative braking mode, the assignment of said first and second user-operated inputs to driving or braking functions being configurable.

Throughout all of the embodiments of the present disclosure, the core inventive concept remains the creation of a low-speed slip interface that the motor actively controls. By doing so, we use a friction element (brake) in a novel way to modulate torque continuously, harnessing the motor's precision and the brake's strength. This unified system replaces or simplifies several traditional components: it provides the functions of a transmission, a clutch, a differential, and a regenerative braking system all in one integrated design. The descriptions above are illustrative of the principles of the invention and various ways in which it can be implemented. It should be understood that the specific configurations (which gearset member is braked, exact control algorithms, one-way clutch inclusion, etc.) can be modified without departing from the scope of the invention. For example, while a planetary gearset is a convenient and compact way to achieve this three-port connection (motor, wheel, brake), other types of 2 degrees-of-freedom gear mechanisms could be used in some applications (such as a bevel gear differential or harmonic drive). Likewise, while hydraulic friction brakes are described, one could envision an electromechanical brake or magnetic particle brake or additional motor instead of the brake, to fulfill a similar role of providing a resistive torque with slip.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed is:

1. A bidirectional slip-controlled drivetrain system, comprising:
   a two degrees-of-freedom gearset having a first member coupled to a driven output, a second member coupled to an electric motor, and a third member coupled to and braked by a friction brake mechanism; and
   a set point controller configured to command the electric motor to maintain a controlled predetermined rotational speed offset relative to a reference speed of the driven output; wherein the controlled speed offset causes a continuous slip of the third member such that torque is transferred between the electric motor and the driven output in both driving and regenerative braking modes, and wherein the magnitude of the torque transferred is proportional to an applied force on the friction brake mechanism.

2. The system of claim 1, wherein the two degrees-of-freedom gearset is a planetary gearset.

3. The system of claim 1, wherein the controlled speed offset maintained by the set point controller is a fixed RPM difference, thereby maintaining a constant slip during both driving and braking.

4. The system of claim 1, further comprising a plurality of two degrees-of-freedom gearsets, each coupled to the driven output, wherein the electric motor is operatively connected to a common member of all said plurality of gearsets to drive the driven outputs together.

5. The system of claim 4, wherein the set point controller determines said reference speed as a function of the rotational speeds of the driven outputs.

6. The system of claim 5, wherein a reference speed function is a limited average of the rotational speeds of the driven outputs, set to prevent any one driven output from exceeding a slip threshold, thereby simulating a limited-slip differential behavior among the driven outputs.

7. The system of claim 1, wherein the friction brake mechanism comprises a brake selected from the group consisting of: a disc brake, a drum brake, a multi-plate clutch or brake pack, or a motor.

8. The system of claim 1, wherein during driving mode the electric motor is controlled to run slightly faster than the driven output's speed so as to generate drive torque and wherein during braking mode the electric motor is controlled to run slightly slower than the driven output's speed so as to generate braking torque in response to engagement of the friction brake mechanism, the electric motor thereby delivering torque to maintain the slip against a resistance of the friction brake mechanism.

9. The system of claim 1, wherein the controlled speed offset between the electric motor and the driven output is maintained at a fixed or variably adjusted value, and wherein the controlled speed offset is optionally increased or decreased based on operating conditions including but not limited to turning behavior, load distribution, thermal considerations, or efficiency optimization.

10. The system of claim 1, wherein electric motor acceleration and deceleration are selectively limited based on indicators of potential traction loss, such that a controlled slip margin is maintained to prevent wheel lock or spin.

11. The system of claim 10, wherein the indicators are based on the proximity of wheel speed to motor speed.

12. The system of claim 1, wherein the applied force on the friction brake mechanism is indirectly precisely inferred from the magnitude of the electric motor torque.

13. The system of claim 4, wherein each of the plurality of gearset is equipped with an independently controllable friction brake mechanism, and wherein:
   an anti-lock braking function is provided by modulating a brake pressure at each gearset to maintain a small non-zero slip and prevent driven output lock during braking, and
   torque vectoring between multiple driven outputs is achieved by adjusting the brake pressure at individual gearsets.

14. The system of claim 4, wherein the plurality of driven outputs comprise multiple wheels, multiple axles, or axle-groups driven through respective gearsets, with or without at least one mechanical differential, such that localized braking at each gearset provides torque modulation across independently or rigidly coupled driven outputs.

15. The system of claim 14, wherein the gearsets for each driven output are of different topologies and ratios.

16. The system of claim 1, further comprising a one-way clutch coupled between elements of the gearset, the one-way clutch being oriented such that when the electric motor rotates in a first direction, the one-way clutch locks to directly drive the driven output without slip in direct-drive mode, and when the electric motor rotates in the opposite direction, the one-way clutch frees, forcing torque transfer through the gearset with a controlled slip mode engaged.

17. The system of claim 16, wherein a first user-operated input device and electric motor throttle are used in combination to initiate driving torque in the controlled slip mode, and a second user-operated input device separately initiates regenerative braking mode, the assignment of said first and second user-operated inputs devices to driving or braking functions being configurable.

18. The system of claim 17, wherein during the controlled slip mode a throttle input defines a maximum motor torque output while the actual torque transmitted to the driven output is determined by the resistance imposed by the friction brake mechanism, such that the throttle sets an upper limit and the applied force on the friction brake mechanism modulates the effective torque below the upper limit.

19. The system of claim 17, wherein in the direct-drive mode, the throttle commands motor torque directly to the driven output, and in the slip-controlled mode, the motor's torque to the driven output is automatically modulated in response to the friction brake engagement.

20. The system of claim 17, wherein the first and second user-operated input devices are selected from the group comprising: a hand lever, or a foot pedal, and wherein the functional roles of said first and second user-operated input devices are assignable or interchangeable by design.

* * * * *